United States Patent
Tsai

(10) Patent No.: US 7,960,848 B2
(45) Date of Patent: Jun. 14, 2011

(54) ELECTRIC BIKE WITH CAPABILITY OF SELF-CHARGING

(75) Inventor: Wen-Bin Tsai, Sijhih (TW)

(73) Assignee: Pan-World Control Technologies, Inc., Taipei (TW)

( * ) Notice: Subject to any disclaimer, the term of this patent is extended or adjusted under 35 U.S.C. 154(b) by 86 days.

(21) Appl. No.: 12/570,066

(22) Filed: Sep. 30, 2009

(65) Prior Publication Data

US 2010/0096859 A1  Apr. 22, 2010

(30) Foreign Application Priority Data

Oct. 21, 2008  (TW) ................. 97218795 U

(51) Int. Cl.
*F02B 63/04* (2006.01)
(52) U.S. Cl. ........................................ 290/1 A
(58) Field of Classification Search ............. 290/1 A
See application file for complete search history.

(56) References Cited

U.S. PATENT DOCUMENTS

| | | | |
|---|---|---|---|
| 6,717,280 B1 * | 4/2004 | Bienville | 290/1 R |
| 7,145,256 B2 * | 12/2006 | Koharcheck et al. | 290/1 R |
| 7,215,034 B2 * | 5/2007 | Hino et al. | 290/40 C |
| 7,342,321 B2 * | 3/2008 | Kitamura | 290/1 R |

* cited by examiner

*Primary Examiner* — T C Patel
*Assistant Examiner* — Iraj A Mohandesi
(74) *Attorney, Agent, or Firm* — Chun-Ming Shih; HDLS IPR Services

(57) ABSTRACT

The present invention provides an electric bike with capability of self-charging. The electric bike is fixedly supported by supporting legs so as to be operated in a stationary point. A user steps on a petal assembly of the electric bike to drive a wheel to rotate. The electric bike further includes a power-generating device, a controller, a battery and a damper. The controller is used to receive a power source outputted by the power-generating device and convert the power source into a plurality of DC power sources to charge the battery. The damper consumes a portion of electricity generated by the power-generating device. With the above arrangement, the electric bike can be charged by itself while the user is exercising.

8 Claims, 4 Drawing Sheets

ELECTRIC BIKE WITH CAPABILITY OF SELF-CHARGING

BACKGROUND OF THE INVENTION

1. Field of the Invention

The present invention relates to an electric bike, and in particular to an electric bike with capability of self-charging.

2. Description of Prior Art

With the rapid increase in the price of petroleum and the importance of environmental protection, electric bike has become one of the green products popularized by the government because of its advantageous features such as no fuel consumption, no waste gas, low noise and low electricity consumption or the like. Thus, the electric bike has become a popular means of transportation recently. In addition to elders and women, students and working people gradually like to ride the electric bike.

Please refer to FIG. 1, which is a block view showing a conventional electric bike. As shown in this figure, the electric bike comprises a petal assembly 10A, a wheel 50A, a battery 20A, a driving unit 30A and a permanent magnet motor 40A. The battery 20A supplies a constant DC voltage. The driving unit 30a is electrically connected to the battery 20A for receiving the DC voltage outputted by the battery 20A to drive the permanent magnet motor 40A, thereby causing the rotation of the wheel 50A. Thus, a user can step on the petal assembly 10A of the electric bike to drive the wheel 50A to rotate. Alternatively, the battery 20A can supply the electricity necessary for driving the electric bike. Therefore, the electric bike can be driven by two ways based on the user's demands. That is, the user can step on the petal assembly 10A to drive the electric bike or rely on the battery 20A to supply electricity necessary for the electric bike. The user can choose one of the two ways for driving the electric bike based on his/her habit, the actual conditions of roads, practical demands or the like. Thus, the use of the electric bike becomes more flexible.

However, when the battery 20A of the electric bike is almost exhausted, it has to be charged, thereby supplementing the amount of electricity in the battery 20A for the next use. As a result, the user may worry about whether the amount of electricity in the battery 20A now is sufficient or not when riding the electric bike. Further, charging the battery 20A is carried out by connecting to utility power, which may increase the electricity fee and cause the discharge of greenhouse gases (such as carbon dioxide) indirectly.

Therefore, in order to overcome the drawbacks of prior art, the Inventor proposes an electric bike with capability of self-charging, which makes the electric bike to become a true green product.

SUMMARY OF THE INVENTION

The present invention is to provide an electric bike with capability of self-charging. The electric bike can be fixedly supported by means of supporting legs, so that it can be operated at a stationary point. A user steps on a petal assembly of the electric bike to cause the rotation of a wheel, so that the electric bike can be charged while the user is exercising.

The present invention provides an electric bike with capability of self-charging. The electric bike includes a power-generating device, a controller, a battery and a damper. The power-generating device is coupled to the wheel by means of a transmission means. Alternatively, the power-generating device can be coupled to the wheel directly. With the rotation of the wheel, the power-generating device is driven to generate a power source. The controller is electrically connected to the power-generating device for receiving the power source and converting the power source into a plurality of DC power sources. The battery is electrically connected to the controller for receiving and storing a first operating power source outputted by the controller. The damper is electrically connected to the controller for receiving a second operating power source outputted by the controller, thereby consuming a portion of the electricity generated by the power-generating device.

In order to better understand the technique, measure and effect of the present invention, please refer to the following description and the accompanying drawings of the present invention. However, the drawings are illustrative only but not used to limit the present invention.

DETAILED DESCRIPTION OF THE INVENTION

In the following, the technical contents of the present invention will be described with reference to the accompanying drawings.

Figure 1:
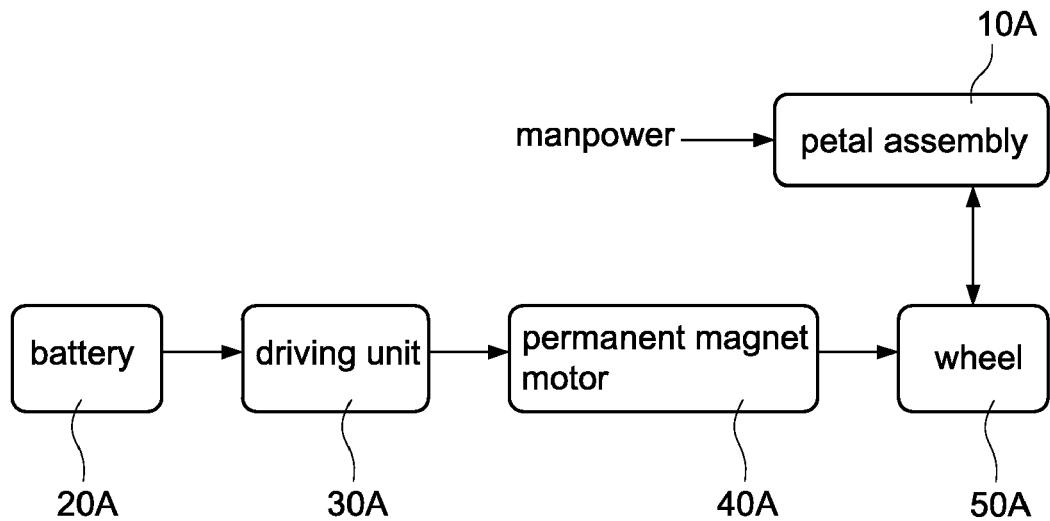
FIG. 1 is a block view showing the conventional electric bike.
Figure 2:
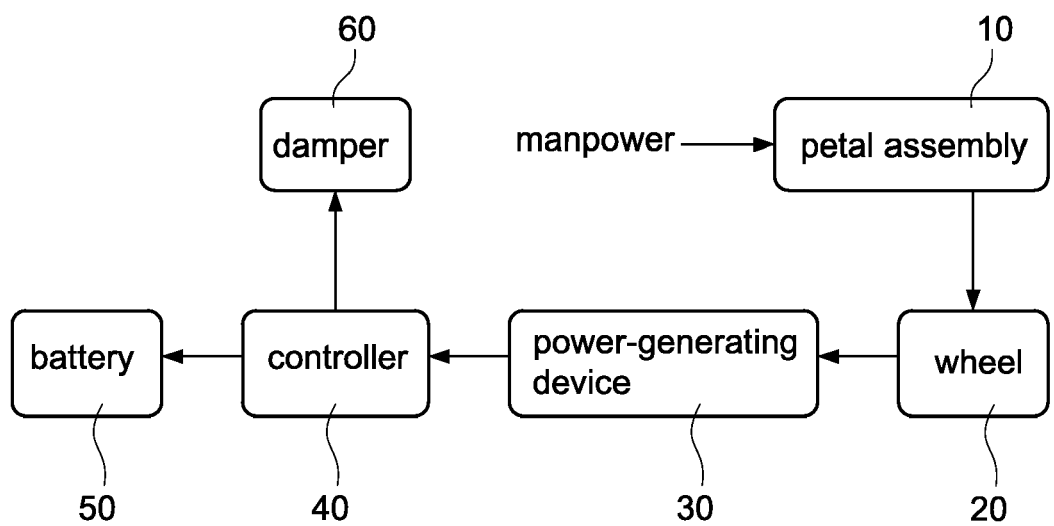
FIG. 2 is a block view showing the electric bike of the present invention.
Figure 3:
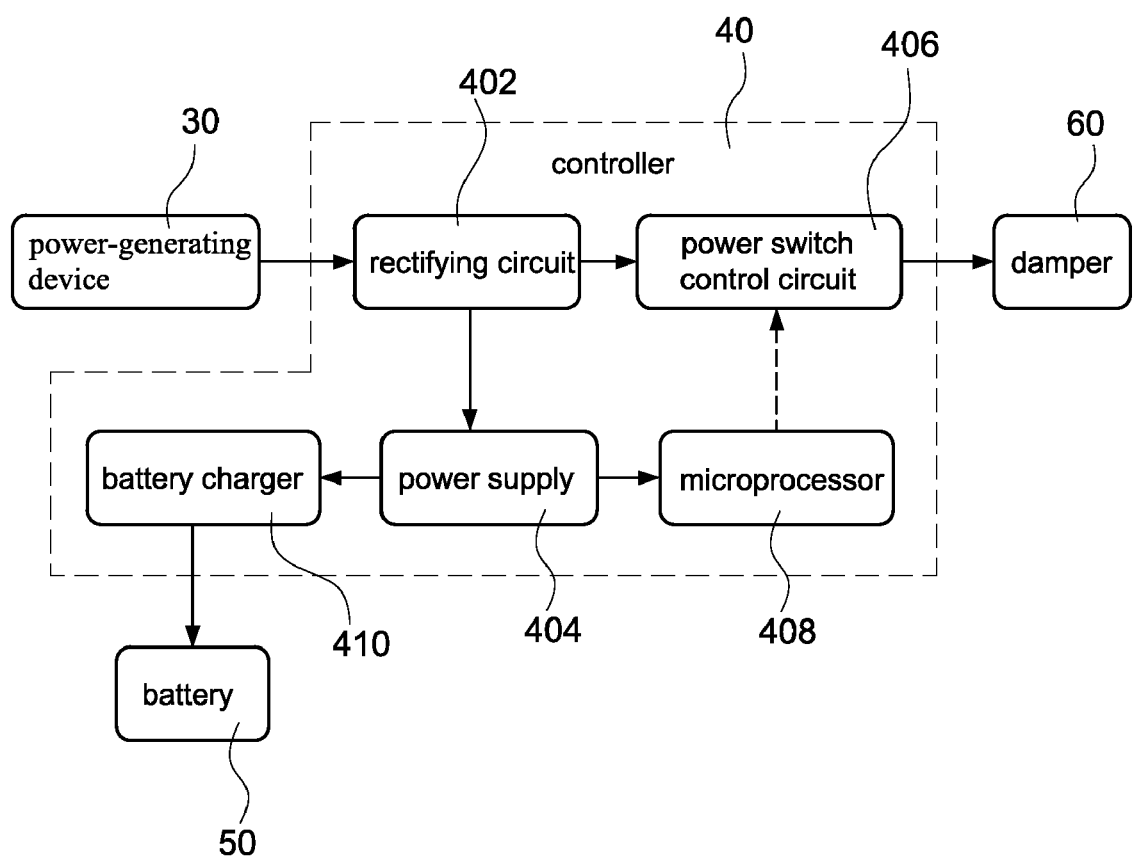
FIG. 3 is a block view showing the controller of the electric bike of the present invention.

Please refer to FIGS. 2 and 3. FIG. 2 is a block view showing the electric bike of the present invention, and FIG. 3 is a block view showing the controller of the electric bike of the present invention. The electric bike of the present invention can be fixedly supported by supporting legs (not shown), so that the electric bike can be operated at a stationary point. A user steps on a petal assembly 10 of the electric bike to drive a wheel 20 to rotate and in turn drive a permanent magnet motor to rotate. The electric bike further includes a power-generating device 30, a controller 40, a battery 50 and a damper 60.

The power-generating device 30 is coupled to the wheel 20 by means of a transmission means (not shown). Alternatively, the power-generating device 30 is coupled to the wheel 20 directly. With the rotation of the wheel 20, the power-generating device 30 can be driven to generate a power source. The power-generating device 30 can be obtained by performing an energy reversing operation to the permanent magnet motor. The power-generating device 30 is another independent generator and can be a brushless permanent magnetic generator. The wheel 20 is driven by a belt (not shown), so that the user can exert a force to drive the wheel 20 to rotate. The controller 40 is electrically connected to the power-generating device 30 for receiving the power source and converting the power source into a plurality of DC power sources. The battery 50 is electrically connected to the controller 40 for receiving and storing a first operating power source outputted by the controller 40. The battery 50 is a charging battery or an ultracapacitor. The damper 60 is electrically connected to the controller 40 for receiving a second operating power source generated by the power-generating device 30, thereby consuming a portion of the electricity generated by the power-generating device 30.

The controller 40 comprises a rectifying circuit 402, a power supply 404, a power switch control circuit 406, a microprocessor 408 and a battery charger 410. The rectifying circuit 402 is electrically connected to the power-generating device 30 for converting the power source generated by the power-generating device 30 into a rectified output power source. The power supply 404 is electrically connected to the rectifying circuit 402 for receiving the rectified output power source and switching the rectified output power source to output a supply power source. The power switch control circuit 406 is electrically connected to the rectifying circuit 402 for receiving the rectified output power source and supplying the second operating power source of a variable duty cycle to the damper 60. The microprocessor 408 is electrically connected to the power supply 404 for receiving the supply power source outputted by the power supply 404 and providing a power driving signal to the power switch control circuit 406. The battery charger 410 is electrically connected to the power supply 404 and receiving the supply power source outputted by the power supply 404 and supplying the first operating power source to the battery 50.

Figure 4:
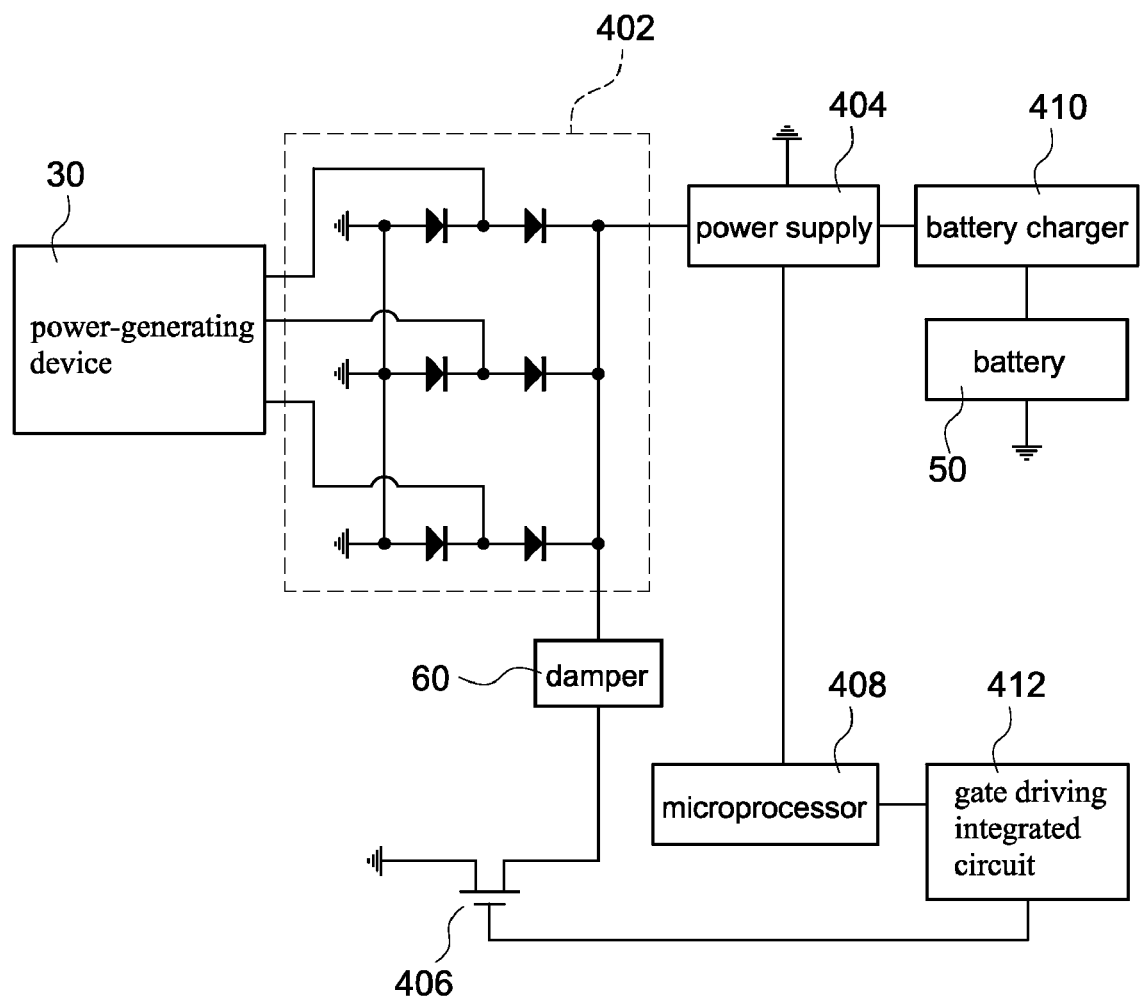
FIG. 4 is a view showing the circuit of the controller according to the first embodiment of the present invention.

Please refer to FIG. 4, which is a view showing the circuit of the controller according to the first embodiment of the present invention. Since the electrical connection of the components in the controller 40 has been described in the above with reference to FIG. 3, the description relating to the controller of FIG. 4 will be omitted for clarity. It should be noted that the power switch control circuit 406 comprises a power metal oxide semiconductor field transistor (Power MOSFET). Further, the controller 40 comprises a gate driving integrated circuit 412. The gate driving integrated circuit 412 is electrically connected between the microprocessor 408 and the power switch control circuit 406 for receiving the power driving signal outputted by the microprocessor 408 and driving the power switch control circuit 406 directly.

Figure 5:
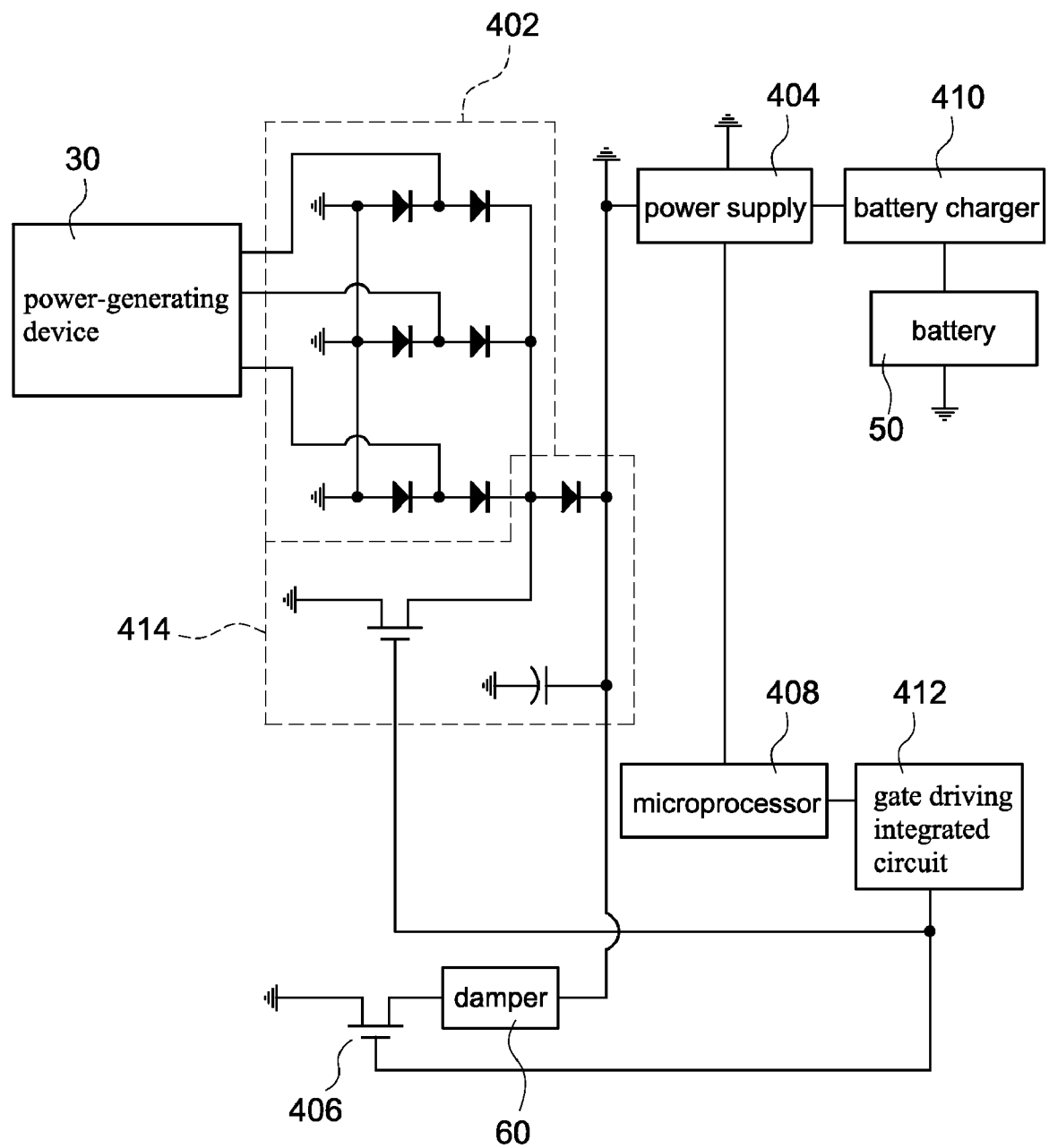
FIG. 5 is a view showing the circuit of the controller according to the second embodiment of the present invention.

Please refer to FIG. 5, which is a view showing the circuit of the controller according to the second embodiment of the present invention. The difference between the second embodiment and the first embodiment of FIG. 4 lies in that the present embodiment further includes a voltage-boosting circuit 414. The voltage-boosting circuit 414 is a switchable network constituted of at least one diode (not shown) and at least one capacitor (not shown). The voltage-boosting circuit 414 is electrically connected to an output end of the rectifying circuit 402 for boosting a non-grounding voltage of the capacitor and making the voltage larger than the output voltage of the rectifying circuit 402. That is, the voltage-boosting circuit 414 is used to boost the output voltage of the rectifying circuit 402, thereby guaranteeing to drive the power supply 404 and the power switch control circuit 406.

According to the above, the present invention has advantageous features as follows. The electric bike can be fixedly supported by the supporting legs, so that the electric bike can be operated at a stationary point. A user steps on the petal assembly of the electric bike to charge the battery 50A. Thus, not only the user can exercise, but also the battery 20A can be charged without connecting to an external utility power. As a result, the electricity fee can be reduced, and the indirect discharge of carbon dioxide can be prevented.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An electric bike with capability of self-charging, the electric bike being fixedly supported by supporting legs so as to be operated at a stationary point, pedal assembly of the electric bike being stepped by manpower to drive a wheel and a permanent magnet motor to rotate, the electric bike including:
   a power-generating device coupled to the wheel by means of a transmission means or directly coupled to the wheel, the rotation of the wheel driving the power-generating device to generate a power source;
   a controller electrically connected to the power-generating device for receiving the power source and converting the power source into a plurality of DC power sources, and the controller including:
      a rectifying circuit electrically connected to the power-generating device for converting the power source generated by the power-generating device into a rectified output power source;
      a power supply electrically connected to the rectifying circuit for receiving the rectified output voltage and switching the rectified output power source to output a supply power source;
      a power switch control circuit electrically connected to the rectifying circuit for receiving the rectified output power source and supplying the second operating power source of a variable duty cycle to the damper;
      a microprocessor electrically connected to the power supply for receiving the supply power source outputted by the power supply and for providing a power driving signal to the power switch control circuit; and
      a battery charger electrically connected to the power supply for receiving the supply power source outputted by the power supply and supplying the first operating power source to the battery;
   a battery electrically connected to the controller for receiving and storing a first operating power source outputted by the controller; and
   a damper electrically connected to the controller for receiving a second operating power source outputted by the controller, thereby consuming a portion of the electricity generated by the power-generating device.

2. The electric bike with capability of self-charging according to claim 1, wherein the power-generating device is obtained by means of executing an energy reversing operation to the permanent magnet motor.

3. The electric bike with capability of self-charging according to claim 1, wherein the power-generating device is an independent generator.

4. The electric bike with capability of self-charging according to claim 3, wherein the independent generator is a brushless permanent magnet generator.

5. The electric bike with capability of self-charging according to claim 1, wherein the battery is a charging battery or an ultracapacitor.

6. The electric bike with capability of self-charging according to claim 1, wherein the wheel is driven by a belt or chain, and the manpower causes the wheel to rotate.

7. The electric bike with capability of self-charging according to claim 1, wherein the controller further comprises a gate driving integrated circuit electrically connected between the microprocessor and the power switch control circuit for receiving the power driving signal outputted by the microprocessor and driving the power switch control circuit directly.

8. The electric bike with capability of self-charging according to claim 1, wherein the power switch control circuit comprises a power metal oxide semiconductor field transistor (Power MOSFET).

* * * * *